Oct. 5, 1954  R. J. GRAY  2,690,761
LUBRICANT VALVE HAVING MEANS FOR MANUALLY
SELECTING DELIVERY PRESSURE
Filed Jan. 10, 1950
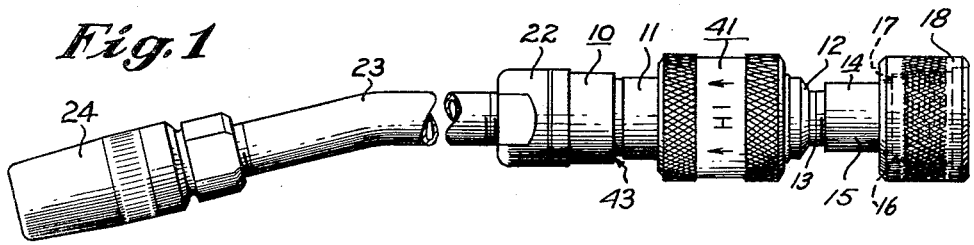
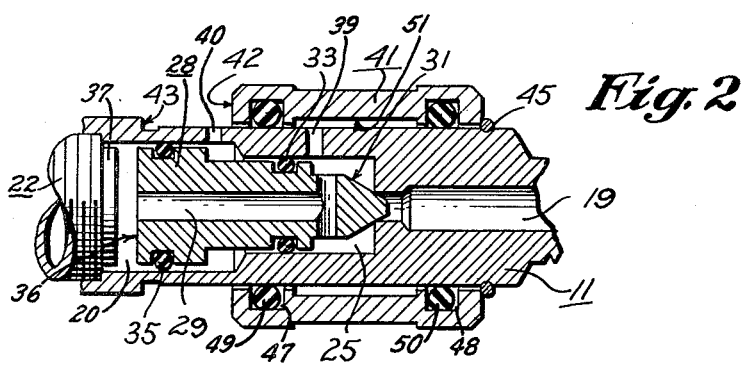
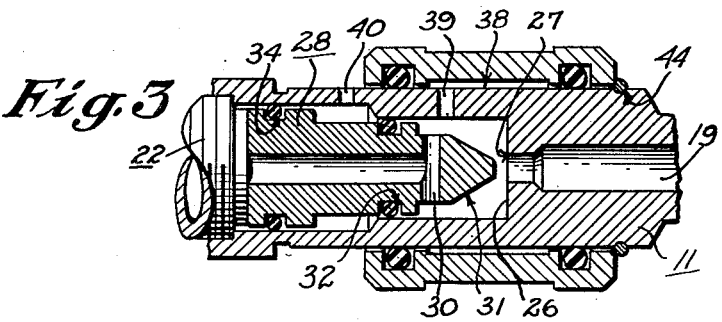
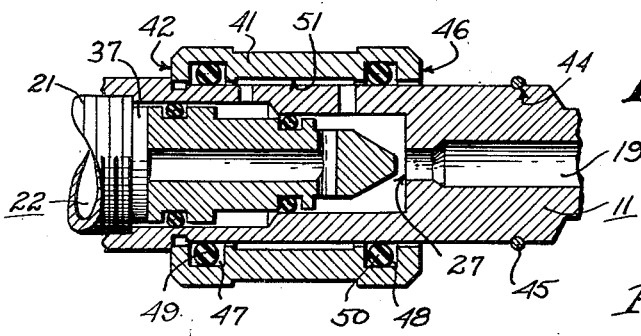
INVENTOR.
Russell J. Gray
BY
Leonard L. Kalish
Attorney Patented Oct. 5, 1954

2,690,761

UNITED STATES PATENT OFFICE 2,690,761

LUBRICANT VALVE HAVING MEANS FOR MANUALLY SELECTING DELIVERY PRESSURE

Russell J. Gray, Meadeville, Minn.

Application January 10, 1950, Serial No. 137,799

5 Claims. (Cl. 137—495)

The present invention relates to a new and useful fluid-transmitting conduit which may, selectively, deliver fluid under pressure at the outlet end of said conduit under the same pressure as the fluid supplied at the inlet end of said conduit, or which may deliver fluid from said conduit under pressure less than the pressure of the fluid at the inlet end of said conduit.

The present invention relates to an adapter for fluid-lines, and more particularly to an adapter for automotive greasing equipment which may transmit fluid to a grease-fitting at the same pressure as the pressure developed by the grease gun or other lubricating device or which may, selectively, transmit the fluid to a fitting under pressure substantially less than the fluid-pressure at the inlet side of said adapter.

An object of the present invention is to provide an adapter for a fluid-line which will automatically reduce the pressure at the outlet side of said lines, if such is desired, without the necessity of relying upon manual control or pressure-gauges or the like, but which may, selectively, permit the fluid to pass through said fluid-line without any reduction in pressure therein.

In automotive equipment or the like, the lubricant-pressure is not the same in all fittings or bearings—the pressure employed to lubricate the bearings depending upon the type of bearing or fitting being lubricated. Thus, low pressure bearings such as universal joints and roller bearings or the like are generally "sealed" bearings and are constructed and adapted to receive lubricant therein only under low pressure. If a lubricant is forced into said bearing under high pressure there is danger of blowing out the packings or the gaskets in such bearings, whereby to render them useless and damaged. Therefore, it is necessary to insure that the lubricant delivered to such bearings is delivered only under low pressure, which is generally substantially less than the pressure capable of being generated by the lubricant dispenser, such as a grease gun.

On the other hand, however, many types of bearings and fittings require lubrication under high fluid-pressure in order completely and satisfactorily to distribute the lubricant to all parts of the bearing. To accommodate high-pressure fittings, greasing equipment is generally constructed to provide the maximum pressure.

An object of the present invention is to provide an adapter for the discharge conduit on high-pressure lubricating equipment which will permit the transfer of fluid under high pressure to those bearings which require high pressure lubrication, but which adapter may be quickly adjusted when lubricating low pressure bearings so as to permit the high pressure greasing equipment to discharge fluid therefrom under reduced or lowered pressure, whereby to prevent damage to said low pressure bearing.

With the above and other objects in view, the present invention includes an adapter having a coupling which may be secured to the discharge port or discharge conduit of high pressure greasing equipment such as a lever-type grease-gun or push-type grease-gun or motor-powered greasing equipment, which grease-gun is adapted to force fluid through said discharge conduit under high pressure, said adapter also having, at the opposite end thereof, means for making connection with standard hydraulic fittings secured to the equipment requiring lubrication; said adapter having a plurality of ports, passages and chambers and having a slidable sleeve surrounding the ports and passages within said adapter whereby to provide, in one axial position of said sleeve, a combination of passageways and chambers through said adapter whereby the fluid will be transmitted without any reduction in pressure, whereas, when said sleeve is in the opposite axial position upon said adapter, the combination of passageways and chambers will insure the passage of fluid therethrough under reduced pressure.

For the purpose of illustrating the invention, there is shown in the accompanying drawings one form thereof which is at present preferred, although it is to be understood that the various instrumentalities of which the invention consists can be variously arranged and organized and that the invention is not limited to the precise arrangements and organizations of the instrumentalities as herein shown and described.

Referring now to the drawings wherein like reference characters indicate like parts, Figure 1 represents a side elevational view of the adapter of the present invention having a hydraulic coupler secured at one end thereof, and having means at the other end thereof adapted to connect said adapter to a conduit supplying hydraulic fluid under substantially high pressure.

Figure 2 represents a fragmentary cross-sectional view of the sleeve and valve mechanism of the adapter of the present invention illustrated in Figure 1.

Figure 3 represents a fragmentary cross-sectional view, similar to Figure 2, showing the adapter of the present invention in its operative position whereby fluid will be transmitted therethrough under low pressure.

Figure 4 represents an enlarged fragmentary cross-sectional view, similar to that of Figures 2 and 3, showing the adapter of the present invention in a position whereby fluid will be transmitted therethrough under high pressure.

The pressure-reducing and pressure-controlling adapter 10, of the present invention, includes a body-portion 11 of a multi-diametered generally cylindrical external shape, having a reduced portion 12 at one end thereof with screw-threads 13 thereon adapted to receive and be secured to a coupling means 14 which is adapted to engage the discharge conduit of a high pressure greasegun or similar lubricating equipment. The connector means 14 may include a threaded portion 15 adapted for connection with the screw threads 13 and a shoulder portion 16 adapted for rotary engagement with the shoulder 17 of the internally threaded connector 18. If desired, a gasket or similar sealing member may be interposed between the shoulder 17 and the shoulder 16. Thus, when the connector 18 is secured by its internal threads to the discharge conduit of a high pressure grease gun or the like, the fluid may be transmitted from the grease gun (not shown) through the sleeve portion 15 into the small axial inlet-bore 19 in the body portion 11 of the adapter.

At the opposite end of the adapter 10 from the threaded portion 12, is a somewhat larger discharge-bore 20, concentric with the inlet-bore 19, having screw threads 21 near the outer end adapted to receive threadedly therein a headed connector-member 22. The connector-member 22 is adapted for engagement with a discharge conduit 23 which may have at its outer end, a hydraulic coupler 24. Between the discharge bore 20 and the inlet-bore 19 in the body member 11, a concentric and co-axial bore 25 is disposed, having a diameter somewhat less than the diameter of the discharge-bore 20 but somewhat greater than the diameter of the inlet-bore 19. A shoulder-portion 26 intervenes the bore 25 and the bore 19, to provide a valve-seat 27 therein. Thus, the bores 19, 20 and 25 provide a through axial conduit between the coupling means 18 and the discharge conduit 23.

A valve-member 28 is disposed within the bores 20 and 25. The valve or piston 28 has an axial bore 29 extending partly therethrough, terminating at one end in the transverse or radial passageway 30, somewhat short of its tapered valve-portion or end-portion 31. The tapered or frusto-conical valve-portion 31 is adapted to enter the axial bore 19 and engage the valve-seat 27, in the rearward position of the piston 28, whereby to seal off the bore 19, as is shown more clearly in Figure 2.

An annular groove 32 having an O-type sealing ring or gasket 33 disposed therein is adapted to provide an axially sliding seal between the piston 28 and the intermediate bore 25.

Another annular groove 34 having an O-type sealing ring or gasket 35 disposed therein provides an axially slidable fluid-tight seal between the piston 28 and the larger discharge-bore 20.

The piston 28 is adapted to move axially and slidably within the bores 20 and 25 and is limited, in its movement in one direction, by the engagement of the frusto-conical portion 31 with the valve-seat 27, as shown in Figure 2. The movement of the piston 28 in the opposite direction is limited by contact of its front end 36 with the shoulder portion 37 of the connector-member 22 threadedly secured at the outer end of the bore 20. The forward axial position of the piston 28 is shown more clearly in Figures 3 and 4.

Between the bore 25 and the outer surface 38 of the body portion 11, one or more transverse radial ports or passageways 39 are disposed. The transverse ports 39 are disposed in the bore 25 between the sealing gasket or O-type ring 33 and the valve seat 27 regardless of the position of the axially slidable piston 28 in the bores 20 and 25.

One or more transverse or radial ports or passageways 40 interconnect the bore 20 and the external surface 38 of the body member 11, and are disposed radially around the body member 11 between the sealing member 33 and the sealing member 35 (regardless of the axial position of the piston 28 in the bores 20 and 25).

An axially slidable sleeve 41 is disposed about the body member 11. The forward end 42 of the sleeve 41 provides an abutment which contacts, in one extreme position of the sleeve 41, the peripheral shoulder 43 of the body-member 11, thus limiting the forward movement of the sleeve 41 on the body-member 11. An annular groove 44, on the outer surface 38 of the body-member 11 near the rear end 12, receives therein a snap ring or locking ring 45 which ring provides a shoulder or abutment which engages the rear end 46 of the sleeve 41 to limit the rearward movement of the sleeve 41. A plurality of internal annular grooves 47 and 48 in the sleeve 41 have O-type sealing members 49 and 50 disposed therein, respectively, to create a slidable fluid-tight seal between the sleeve 41 and the body-member 11.

An enlarged internal annular groove 51 is disposed between the sealing members 49 and 50 in the sleeve 41 and provides a fluid-tight chamber or passageway between the sleeve 41 and the body-member 11. When the sleeve 41 is moved to the axial position wherein the rear shoulder-portion is in contact with the abutment 45, the annular chamber 51 is disposed in juxtaposition to the transverse or radial port 39 with the sealing member 49 disposed between the transverse port 39 and the transverse port 40. Thus, only the port 39 is in communication with the annular chamber 51.

However, when the sleeve 41 is moved to its forwardly limited position on the body-member 11 with the end 42 abutting the shoulder 43, both of the axial ports 39 and 40 are in communication with the chamber 51 in the sleeve 41. Thus, the axially slidable sleeve 41 may selectively be positioned so that either one or both of the transverse ports 39 and 40 are in communication with the chamber 51 therein.

The operation of the adapter of the present invention is as follows:

When the connector 14 is operatively secured to a source of lubricant or fluid under high pressure, the fluid will be transmitted from the fluid-producing means through the coupling means 14 into the axial bore 19 of the adapter.

If it is desired to transmit fluid through the adapter into the discharge pipe 23 at a substantially reduced pressure from that delivered to the bore 19, the axially slidable sleeve 41 is moved to its rearward limiting position (wherein the shoulder-portion 46 is in contact with the abutment 45), as shown in Figures 2 and 3. When the lubricant, under high pressure, passes through the axial bore 19 against the frusto-conical end 31 of the piston 28 within the valve-seat 27, it will move the piston 28 from the valve-seat 27 to a position against the shoulder 37 of the head 22 and permit the flow of fluid, under high pressure, into the bore 25 and through the transverse passageway 30 in the piston 28 and through the axial bore 29 therein, and out through headed connector 22 and the discharge conduit 23. The annular seal 33 prevents the passage of fluid from the bore 25 into the bore 20. Although the fluid under high pressure may pass through the transverse port 39 into the sleeve-chamber 51, the annular gaskets or seals 49 and 50 prevent the discharge of fluid from the chamber 51.

When the piston 28 is in the forward position shown in Figures 3 and 4, the fluid-pressure exerted against the piston 28 in a forward direction acts upon the smaller effective area of the piston (which is equal to the internal area of the intermediate bore 25 less the area of the annular bore 29) to hold the frusto-conical or tapered valve-portion 31 of the piston 28 unseated from the valve seat 27 and hold the piston 28 in the position shown in Figure 3. The fluid under pressure will pass through the axial bore 29 and out through the discharge conduit 23, and the piston 28 will remain in the position shown in Figure 3 as long as the fluid will freely pass through the discharge conduit 23.

However, when a back pressure is created in the discharge conduit 23, the fluid-pressure in the conduit 23 (and similarly in the bore 20) is exerted against the larger effective area of the piston 28 (which is equal to the internal area of the bore 20 less the area of the axial bore 29).

The effective area of the piston 28 across the sealing member 33 is proportionately less than the effective area of the piston across the sealing member 35.

When the force which moves the piston rearwardly (back-pressure in bore 20 multiplied by effective area across the large end of the piston) is slightly greater than the force which moves the piston forwardly (fluid-pressure in bore 19 multiplied by the effective area across the small end of the piston) the piston 28 will move toward the bore 19 until the needle-valve 31 enters the valve-seat 27 and seals off the bore 19. When the valve-seat 27 is thus closed by the back-pressure in the conduit 23, the fluid in the discharge conduit 23 (with the axially slidable sleeve 41 shown in the position of Figures 2 and 3) will be proportionately less than the fluid-pressure in the inlet-bore 19. This proportion is the ratio of the small effective diameter to the large effective diameter of the piston 28. When the pressure in the discharge conduit 23 is relieved or lowered, the higher pressure in the bore 19 will cause the valve 31 to move from the valve-seat 27 and permit more fluid to pass through the transverse passageway 30 and the axial bore 29, to be discharged from the conduit 23. But when the back-pressure in the conduit 23 builds up to a point which is proportionately (as above defined) less than the fluid pressure supplied to the adapter, the piston 28 will close off the valve seat 27 and, thus, the fluid discharged through the conduit 23 will always be at a proportionately lower pressure than the pressure supplied to the adapter when the sleeve 41 is in the rearward position shown in Figures 1, 2, and 3.

However, when it is desired to transmit fluid through and from said adapter at the same pressure as the fluid-pressure developed by the grease gun, the sleeve 41 is moved to the forward position shown in Figure 4 wherein the edge 42 strikes the shoulder portion 43. In this position the chamber 51 interconnects the transverse ports 39 and 40. When the fluid at high pressure forces the piston 28 away from the valve seat 27, the fluid will be transmitted through the transverse passageway 30 and the axial bore 29 out through the conduit 23. At the same time, this high-pressure fluid passes through the transverse ports 39 and through the chamber 51 and into the rear end of the bore 20 through the transverse ports 40. The fluid under pressure which holds the piston in the forward position (shown in Figure 4) acts against the large area of the piston (as represented by the internal area of the chamber 20, between the sealing members 33 and 35) as well as against the smaller diameter portion of the piston, as described above.

Thus the effective piston-area against which the high pressure fluid is exerted (to force the piston to the position shown in Figure 4) is the area of the bore 20 less the area of the bore 29, and this effective area is the same as the piston-area against which the pressure is exerted in the chamber 20 on the discharge-conduit side thereof, as described hereinabove. Hence, the piston 28 will not be moved rearwardly when back-pressure builds up in the discharge conduit 23 because the force which moves the valve 31 to a closed position, as described hereinabove, is no greater than the force which holds the piston in its forward position, with the valve open. In this position of the sleeve 41 the high-pressure fluid is passed through the axial bore 29 and the transverse passageway 30 out through the discharge conduit 23 at the same pressure as is supplied to the adapter 10.

Thus the adapter 10 selectively may be positioned to transmit fluid under either high or low pressure, therethrough, by moving the axially slidable sleeve 41 to either one or the other of its limiting positions along the outer surface 38 of the body member 11.

The coupler of the present invention may be adapted for transmitting fluid under two or three or more pressures, selectively chosen, by providing additional chambers similar to the bores 20 and 25, and additional transverse radial ports similar to the ports 39 and 40, and by enlarging the chamber 51, whereby the high pressure fluid-force on the inlet side of the piston 28 might be exerted against one, two, three or more diameters, depending upon the position of the modified sleeve upon the body portion 11.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having described my invention, I claim as new and desire to protect by Letters Patent the following:

1. An adapter to transmit fluid from fluid-supply means selectively at the same pressure or at pressure less than the pressure generated by the fluid-supply means, said adapter including a body-member with an axially slidable sleeve thereon, an axially slidable valve operatively disposed within a multi-diametered bore in said body-member, a valve-seat at the inlet end of said bore adapted to be closed by said axially slidable valve, a fluid-passageway in said valve having an inlet end near the valve end adjacent the seat, slidable fluid-tight sealing means between a reduced diametered portion of said valve and a reduced diametered portion of said bore, slidable fluid-tight sealing means between an enlarged diametered portion of said valve and an enlarged diametered portion of said bore, the inlet-end of the fluid-passageway in said valve disposed axially between said valve-seat and the first-named sealing means, said first-named sealing means disposed axially between the inlet-end of the fluid-passageway in said valve and said second-named sealing means, a plurality of transverse ports extending outwardly from said bore, at least one port disposed axially between said valve seat and said first-named sealing means and extending from the reduced diametered portion of said bore, and at least one port disposed axially between said first-named sealing means and said second-named sealing means and extending from the enlarged diametered portion of said bore, a chamber in said sleeve adapted operatively to interconnect the transverse ports extending from both the enlarged diametered portion and the reduced diametered portion of said bore, when said sleeve is in one position on said body member, and for operative alignment with only the transverse port extending from said reduced diametered portion of said bore when said sleeve is in another position on said body-member.

2. An adapter to transmit fluid from fluid-supply means selectively at the same pressure or at pressure less than the pressure generated by the fluid supply means, said adapter including a body-member with an axially slidable sleeve thereon, an axially slidable valve operatively disposed within a multi-diametered bore in said body-member, a valve-seat at the inlet end of said bore adapted to be closed by said axially slidable valve, a fluid-pasageway in said valve having an inlet-end near the valve-end adjacent the seat, slidable fluid-tight sealing means between a reduced diametered portion of said valve and a reduced diametered portion of said bore, slidable fluid-tight sealing means between an enlarged diametered portion of said valve and an enlarged diametered portion of said bore, the inlet-end of the fluid-pasageway in said valve disposed axially between said valve-seat and the first-named sealing means, said first-named sealing means disposed axially between the inlet-end of the fluid-pasageway in said valve and said second-named sealing means, a plurality of transverse ports extending outwardly from said bore, at least one port extending from the reduced diametered portion of said bore, and disposed axially between said valve-seat and said first-named sealing means, and at least one port extending from the enlarged diametered portion of said bore, and disposed axially between said first-named sealing means and said second-named sealing means, a chamber in said sleeve adapted operatively to interconnect the transverse ports extending from both the enlarged diametered portion and the reduced diametered portion of said bore, when said sleeve is in one position on said body member, and for operative alignment with only the transverse port extending from said reduced diametered portion of said bore when said sleeve is in another position on said body-member.

3. An adapter to transmit fluid from fluid-supply means selectively at the same pressure or at pressure less than the pressure generated by the fluid-supply means, said adapter including a body-member with an axially slidable sleeve thereon, an axially slidable valve operatively disposed within a multi-diametered bore in said body-member, a valve-seat at the inlet end of said bore adapted to be closed by said axially slidable valve, and adapted to limit the axial movement of said valve-member in one direction, stop-means in said bore adapted to limit the axial movement of said valve-member in the other direction, a fluid-passageway in said valve having an inlet-end near the valve-end adjacent the seat, slidable fluid-tight sealing means between a reduced diametered portion of said valve and a reduced diametered portion of said bore, slidable fluid-tight sealing means between an enlarged diametered portion of said valve and an enlarged diametered portion of said bore, the inlet-end of the fluid-passageway in said valve disposed axially between said valve-seat and the first-named sealing means, said first-named sealing means disposed axially between the inlet-end of the fluid-passageway in said valve and said second-named sealing means, a plurality of transverse ports extending outwardly from said bore, at least one port extending from the reduced diametered portion of said bore, and at least one port extending from the enlarged diametered portion of said bore, a chamber in said sleeve adapted operatively to interconnect the transverse ports extending from both the enlarged diametered portion and the reduced diametered portion of said bore, when said sleeve is in one position on said body member, and for operative alignment with only the transverse port extending from said reduced diametered portion of said bore when said sleeve is in another position on said body-member.

4. An adapter to transmit fluid from fluid-supply means selectively at the same pressure or at pressure less than the pressure generated by the fluid-supply means, said adapter including a body-member with an axially slidable sleeve thereon, stop-means to limit the axial movement of said sleeve on said body-member, an axially slidable valve operatively disposed within a multi-diametered bore in said body-member, a valve-seat at the inlet end of said bore adapted to be closed by said axially slidable valve, and adapted to limit the axial movement of said valve in one direction, stop-means in said bore adapted to limit the axial movement of said valve in the other direction, a fluid-pasageway in said valve having an inlet-end near the valve-end adjacent the seat, slidable fluid-tight sealing means between a reduced diametered portion of said valve and a reduced diametered portion of said bore, slidable fluid-tight sealing means between an enlarged diametered portion of said valve and an enlarged diametered portion of said bore, the inlet-end of the fluid-passageway in said valve disposed axially between said valve-seat and the first-named sealing means, said first-named sealing means disposed axially between the inlet-end of the fluid-passageway in said valve and said second-named sealing means, a plurality of transverse ports extending outwardly from said bore, at least one port extending from the reduced diametered portion of said bore, and disposed axially between said valve-seat and said first-named sealing means, and at least one port extending from the enlarged diametered portion of said bore, and disposed axially between said first-named sealing means and said second-named sealing means, a chamber in said sleeve adapted operatively to interconnect the transverse ports extending from both the enlarged diametered portion and the reduced diametered portion of said bore, with the transverse port extending from the enlarged diametered portion of said bore uncovered when said sleeve is in another position on said body-member.

5. A high-and-low pressure-fluid adapter for use intermediate a source of lubricant under pressure and the point of application of such lubricant for permitting the discharge pressure of the lubricant to be selected, at the will of the operator, at either substantially that of the lubricant supply or some fraction thereof at a predetermined ratio thereto, said adapter including a passageway forming two different diametered cylindrical bores, an inlet-port opening into the small diametered bore for the ingress of lubricant, an outlet from the large diametered bore, a stepped two-diametered piston slidably mounted in said two cylindrical bores and fluid-sealed in relation thereto, said piston having a passageway therein having an inlet end near the piston end adjacent the inlet port, and having an inlet-port closure at its small-diametered end adapted to seat against the aforesaid inlet-port to close it off against the ingress of lubricant when the piston is advanced in the direction of said inlet-port, pressure-control ports communicating respectively with said large-diametered and said small-diametered cylindrical bores, and a manually-operable axially-slidable pressure-control member in operative juxtaposition to said pressure-control ports, a chamber in said pressure-control member adapted operatively to interconnect both of the pressure-control ports when the pressure-control member is in one axial position, and adapted for operative alignment with only the pressure-control port communicating with said small diametered bore when said pressure-control member is in another axial position, said chamber arranged whereby said pressure-control member, when moved into one of its two operative positions, will establish a pressure-equalizing communication between the inlet side of each of the large-diametered and of the small-diametered cylindrical bores through said pressure-control ports and whereby said control member, when in its other operative position, will prevent pressure equalization between the inlet-side of each of the large-diametered and small-diametered cylindrical bores.

References Cited in the file of this patent

UNITED STATES PATENTS

| Number | Name | Date |
|---|---|---|
| 457,056 | McNeil | Aug. 4, 1891 |
| 1,406,012 | Hinchman | Feb. 7, 1922 |
| 1,850,879 | Hunt | Mar. 22, 1932 |